(12) United States Patent
MacMaster

(10) Patent No.: US 7,052,746 B2
(45) Date of Patent: May 30, 2006

(54) PRIVACY SCREEN FOR A DISPLAY

(75) Inventor: Steven William MacMaster, Philadelphia, PA (US)

(73) Assignee: E. I. du Pont de Nemour and Company, Wilmington, DE (US)

( * ) Notice: Subject to any disclaimer, the term of this patent is extended or adjusted under 35 U.S.C. 154(b) by 15 days.

(21) Appl. No.: 10/722,719

(22) Filed: Nov. 26, 2003

(65) Prior Publication Data

US 2005/0112342 A1  May 26, 2005

(51) Int. Cl.
*C09K 19/00* (2006.01)

(52) U.S. Cl. .................. 428/1.2; 428/1.1; 428/1.31; 349/194; 349/8; 349/16; 359/489; 359/464; 359/501; 359/601

(58) Field of Classification Search ............... 349/201, 349/194, 8, 16; 428/1.31, 1.1, 1.2, 119, 174, 428/213, 220; 359/472, 464, 501, 493, 601, 359/901, 489
See application file for complete search history.

(56) References Cited

U.S. PATENT DOCUMENTS

| | | | |
|---|---|---|---|
| 5,175,638 A | 12/1992 | Kanemoto et al. | |
| 5,612,801 A | 3/1997 | Winker | |
| 6,124,920 A * | 9/2000 | Moseley et al. | ............ 349/201 |
| 6,239,853 B1 | 5/2001 | Winker et al. | |
| 6,262,843 B1 | 7/2001 | Marx | |
| 6,372,309 B1 | 4/2002 | Claussen et al. | |
| 6,462,892 B1 | 10/2002 | Kuroki | |
| 2001/0055160 A1 | 12/2001 | Hsu | |
| 2002/0158967 A1 | 10/2002 | Janick et al. | |
| 2003/0067568 A1 | 4/2003 | Hamamoto | |
| 2003/0147030 A1 | 8/2003 | Sone | |
| 2003/0193636 A1 * | 10/2003 | Schadt et al. | |

FOREIGN PATENT DOCUMENTS

| | | |
|---|---|---|
| EP | 0 478 779 A1 | 4/1992 |
| EP | 111 8885 A1 * | 7/2001 |
| WO | WO 03/014780 A2 | 2/2003 |

* cited by examiner

*Primary Examiner*—Merrick Dixon

(57) ABSTRACT

A privacy screen for a display (e.g., a LCD) includes having a polarizing film and a birefringent film is described. The privacy screen transmits substantial amounts of light emanating from the display in an orthogonal (or near-orthogonal) direction while not transmitting substantial amounts of horizontal, non-orthogonal light emanating from the display. In this manner, a privacy effect results in that the display is viewable by someone only when that someone is essentially directly in front of the display.

19 Claims, 9 Drawing Sheets

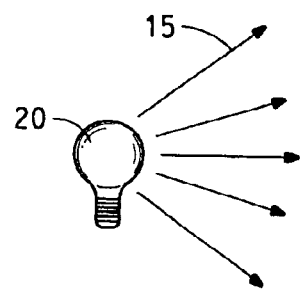
FIG. 5
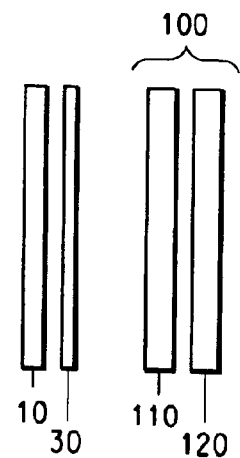
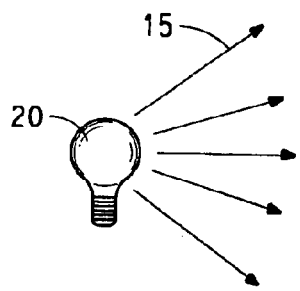
FIG. 6
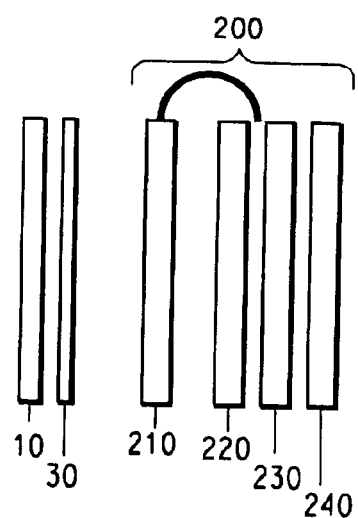

PRIVACY SCREEN FOR A DISPLAY

BACKGROUND OF THE INVENTION

1. Field of the Invention

This invention pertains to displays, especially liquid crystal displays (LCDs) and, more particularly, to an assembly for restricting the field of view of such displays so that the image appearing on the display is visible primarily to a user sitting directly in front of the screen and is not observable to other individuals viewing the screen at an oblique angle. This objective of viewing privacy is achieved by substantially eliminating light emanating from the screen other than in a substantially perpendicular manner.

2. Description of Related Art

Liquid crystals are useful for electronics displays because polarized light traveling through the liquid crystal layer is affected by the layers birefringence, which can be changed by the application of a voltage across the layer. As a result, the transmission or reflection of light can be controlled with much less power than is required for the luminescent materials used in other types of displays. This contributes to the longer life, lower weight and low power consumption of the LCD displays.

In LCD computer monitor and television displays a matrix of pixels is arranged across the display. These pixels are activated by an X-Y sequential addressing scheme between two sets of perpendicular conductors. Where the displays incorporate nematic liquid crystals, arrays of thin film transistors can be used to control the driving voltages at the individual pixels.

In many applications, it is desirable to broaden the angle under which the display is viewable without distortion of loss of contrast. For example, in avionics it is important that the display be clear and undistorted to several individuals viewing the screen from various angles. In many instances, it is also desirable for a computer display to be visible to observers other than the user and for video screens to present an undistorted image to an audience sitting other than directly in front of the screen. Assemblies which will allow a greater undistorted, high intensity viewing angle are shown in numerous prior art references, such as U.S. Pat. No. 5,612,801.

However, numerous applications are arising where it is desirable to significantly narrow the usable viewing angle to provide viewing privacy. The intention is to allow access to the image on the screen only to the party sitting directly in front of the screen and to prevent a person sitting next to the user or standing over the user from seeing the image on the screen. For example, it is now becoming commonplace for computer users to use portable computers on airplane flights to work on proprietary documents. For security reasons, it is most desirable to prevent a passenger sitting in the next seat or passing down the aircraft aisle from observing the information on the screen. Secondly, newer cabin designs in aircraft are replacing larger, centrally located viewing screens, usually hanging over the aisle, with smaller individual screens which drop from the overhead compartment, or individual screens mounted in each passenger's seat back or tray table so that each passenger can select his own entertainment. Often, because each passenger may be receiving and/or paying individually for his or her chosen entertainment display, such as a movie or access to various web sites or, for security reasons, the receipt of proprietary e-mail messages, it is desirable to prevent surrounding parties from observing the contents of the display.

Most devices developed to enhance usage of LCD displays are directed to making the image thereon available to a broader audience. Devices which can be added to the LCD device to narrow the field of view and limit the scope of the viewing audience in a simple, light weight and unobtrusive manner without loss of brightness of the image are not commonly available. Currently, to reduce the angle of vision micro-louvers, provided by 3M, are used. However they result in a reduction of image brightness which must be compensated for by increasing the power applied to the back light and/or use of various brightness enhancing films. That deficiency is addressed by the present invention which comprises an LCD screen having an optical axis in combination with a privacy screen comprising a birefringent film and a polarizing film. The privacy screen is assembled in a manner such that the horizontal components of light rays emitted from the display screen in other than a substantially orthogonal manner are blocked by the privacy screen and not transmitted to the observer. As a result, the opportunity to view the image on the screen from other than approximately 90° is significantly reduced or eliminated. The intensity of the transmitted light may be enhanced by the addition a brightness enhancement film.

U.S. Pat. No. 6,239,853 discloses a LCD privacy screen comprising staggered waveplates that contain alternating birefringent and isotropic film portions. While the privacy screen disclosed in this patent may be effective, it has drawbacks of having a complex design of alternating birefringent and isotropic regions (as stripes), which are difficult, time-consuming and relatively expensive to fabricate. More importantly, the Rockwell patent is based on full-wave and half-wave considerations only without consideration to changes in angle of incidence upon retardation effects. There is a need for an efficient and costeffective privacy screen for the display industry.

SUMMARY OF THE INVENTION

The present invention addresses the above-mentioned need in that it affords a privacy screen that is based on change in retardation as the angle of incidence (or view angle) changes for light passing through a birefringent medium.

In one embodiment, the invention is a privacy screen for a display comprising:

a) a first uniaxially birefringent film for transmitting light received from the display that is linearly polarized along a display polarizing axis, the first birefringent film having a thickness $d_1$ and a retardation value R:

$$R=(n_e-n_o)d_1/\cos\theta$$

θ being the angle of light incident upon the screen from the display, and $n_o$ and $n_e$ being the refractive indices, respectively, along the ordinary and extraordinary axes of the first birefringent film, wherein $d_1$ is greater than 25 micrometers so that R is responsive to changes in θ; and b) a first polarizing film having a polarizing axis positioned to receive the linear polarized light transmitted from the first birefringent film.

In another embodiment, the invention is a privacy screen as indicated above and further comprising:

c) a second birefringent film for transmitting light received from the first polarizing film that is linearly polarized to the polarizing axis of the first polarizing film, the second birefringent film having a thickness $d_2$ of greater than or equal to 25 micrometers; and d) a second polarizing film positioned to receive the linear polarized light transmitted from the second birefringent film, the second polarizing film having a polarizing axis.

In yet another embodiment, the invention is as indicated above and further comprising:

e) uniaxially birefringent film for transmitting light received from the second polarizing film that is linearly polarized to the polarizing axis of the second polarizing film, the third birefringent film being equivalent to the first birefringent film and having a polarizing axis.

In yet still another embodiment, the invention is a privacy screen for a display comprising:

a) a first biaxially birefringent film for transmitting light received from the display that is linearly polarized along a display polarizing axis, the first birefringent film having a thickness $d_1$ and a retardation value $R_\theta$ for light incident on the film at an angle $\theta$ measured with respect to normal that is approximated by the relationship below:

$$R_\theta \sim = R_o[1+\sin^2 \theta/2n_i n_{avg}];$$

wherein the first biaxially birefringent film is characterized as having unit vectors a and b that define its film plane and a unit vector c that defines its normal; $R_o=[n_b-n_a]d_1$ and is retardation of normal incident light; $n_{avg}=(n_a+n_b+n_c)/3$=average index for the biaxially birefringent film; $n_i$ is selected from the group consisting of $n_a$, $n_b$, and $n_c$ to correspond to the unit vector (a, b, or c) that describes the vertical direction of the display; and $d_1$ is greater than 25 micrometers so that R is responsive to changes in $\theta$; and b) a first polarizing film having a polarizing axis positioned to receive the linear polarized light transmitted from the first birefringent film.

There are additional embodiments involving the second and third birefringent films and the second polarizing film in the case of a first biaxially birefringent film that are otherwise the same as those listed above for a uniaxially birefringent film (the same except for the uniaxial film versus biaxial film difference).

BRIEF DESCRIPTION OF THE DRAWINGS

FIG. 5 is a side view of one embodiment (100) of the privacy screen of this invention in use on a typical back-lit display.

FIG. 6 is a side view of another embodiment (200) of the privacy screen of this invention in use on a typical back-lit display.

DETAILED DESCRIPTION OF THE PREFERRED EMBODIMENT(S)

Figure 1:
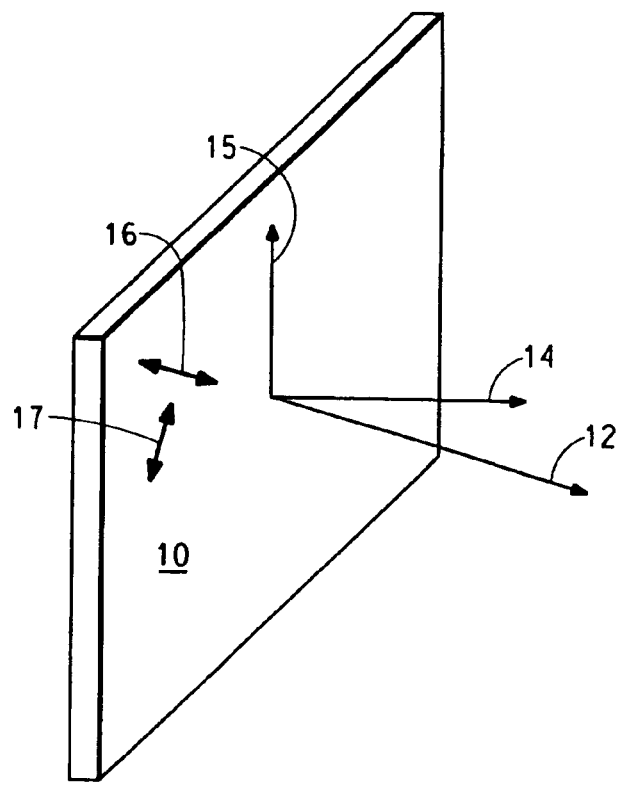
FIG. 1 is a schematic perspective representation of light emitted from state of the art LCD screens.

FIG. 1 is a schematic representation of a LCD display screen 10 showing a ray of light 12 emanating perpendicular (orthogonal or normally incident) to the face of a LCD screen (90°) and two non-orthogonal rays of light 14 and 15, which are representative of non-orthogonal light. The first ray 14 is other than 90° in the horizontal direction only and the second ray is other than 90° in the vertical direction only. The non-orthogonal ray with horizontal components 14 provides visibility of the image on the LCD screen to other than the individual sitting directly in front of the screen. It is the purpose of this invention to prevent as much as is practical of this horizontal, non-orthogonal ray from being visualized.

A LCD display screen, such as 10, outputs polarized light rays having a polarity of either +45° (as illustrated by double-arrowed line 16 in FIG. 1) or −45° (as illustrated by double-arrowed line 17 in FIG. 1), but does not output light having both polarities. This LCD display screen has a display polarizing axis of either +45° or −45° as indicated above. Before describing theoretical considerations and other details relating to the privacy screen of this invention, the structural features of the main embodiments of privacy screens of this invention will be outlined.

Figure 2A:
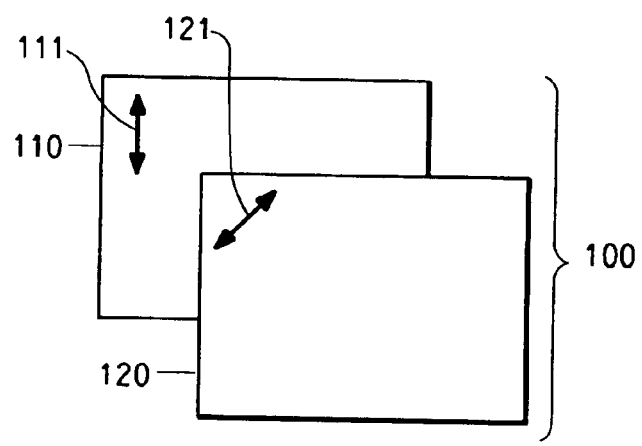
FIG. 2A is a perspective front view of a two-layer privacy screen that is one embodiment of this invention.
Figure 2B:
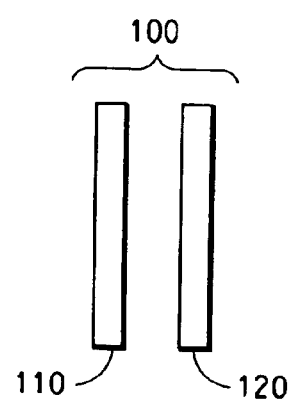
FIG. 2B is a side view of the two-layer privacy screen of FIG. 2A.

In one embodiment, the privacy screen 100 of this invention comprises a first birefringent film 110 and a first polarizing film 120 as illustrated in FIGS. 2a and 2b. The birefringent film can possess properties such that it is uniaxally birefringent or biaxally birefringent (as defined below). Preferably this film is uniaxally birefringent. The first polarizing film is also sometimes called an analyzer. The first birefringent film 110 possesses an optical axis and the first polarizing film possesses a polarizing axis. The angular relationships between the display polarizing axis, the optical axis of the first birefringent film, and the polarizing axis of the first polarizing film are not limited apart from there being preferences for these angular relationships. Preferably, in this embodiment, the display polarizing axis is orthogonal (90° angular relationship, crossed configuration) or approximately orthogonal to the polarizing axis of the first polarizing film and the optical axis of the first birefringent film approximately bisects the angle between the display polarizing axis and the polarizing axis of the first polarizing film. This preference corresponds to the relationships of the axes as shown in FIGS. 1 and 2A where the display polarizing axis is 16, the optical axis of the first birefringent film is 111, and the polarizing axis of the first polarizing film is 121.

Figure 3A:
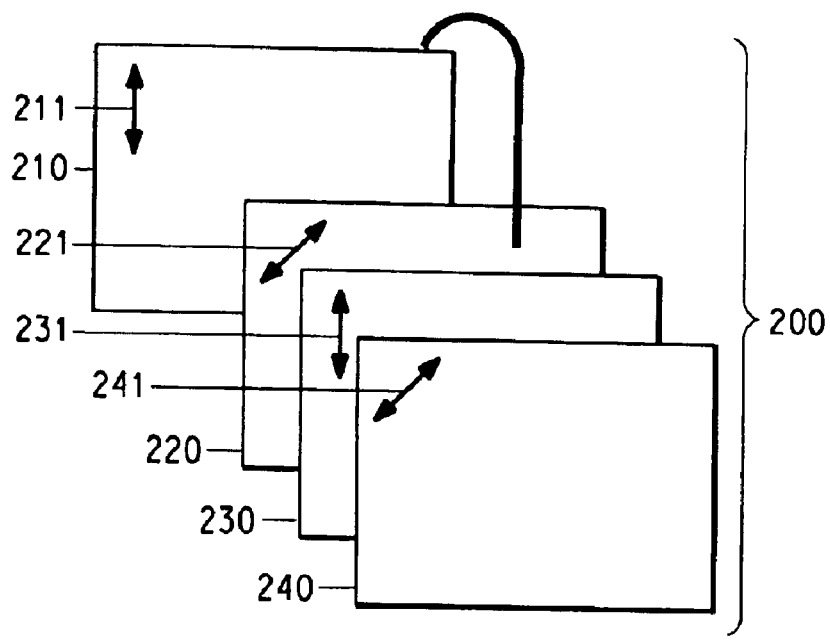
FIG. 3A is a perspective front view of a four-layer hinged-structure privacy screen that is another embodiment of this invention.
Figure 3B:
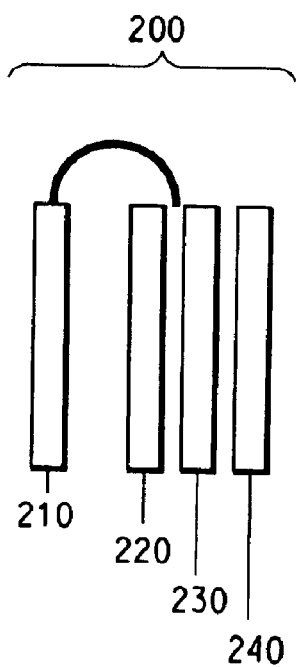
FIG. 3B is a side view of the four-layer hinged-structure privacy screen of FIG. 3A.

In another embodiment, the privacy screen 200 of this invention comprises a first birefringent film 210, a first polarizing film 220, a second birefringent film 230, a second polarizing film 240, and a hinge 250 as illustrated in FIGS. 3A and 3B. The hinge 250 can be utilized to position the first birefringent film 210 such that it is adjacent to and in direct contact with either the first polarizing film 220 (as it is shown in FIGS. 3A and 3B) or the second polarizing film 240. Both birefringent films can possess properties such that they are uniaxally birefringent or biaxally birefringent (as defined below). Preferably these films are uniaxally birefringent. The first polarizing film is also sometimes called an analyzer. The first and second birefringent films 210 and 230 possesses optical axes and the first and second polarizing films 220 and 240 possesses polarizing axes. The angular relationships between the display polarizing axis, the optical axes of the first and second birefringent films, and the polarizing axes of the first and second polarizing films are not limited apart from there being preferences for these angular relationships. Preferably, in this embodiment, the display polarizing axis is orthogonal (90° angular relationship, crossed configuration) or approximately orthogonal to the polarizing axes of the first and second polarizing films and the optical axes of the first and second birefringent films approximately bisect the angle between the display polarizing axis and the polarizing axes of the first and second polarizing films. This preference corresponds to the relationships of the axes as shown in FIGS. 1 and 3A where the display polarizing axis is 16, the optical axis of the first birefringent film is 211, the polarizing axis of the first polarizing film is 221, the optical axis of the second birefringent film is 231, and the polarizing axis of the second polarizing film is 241. Preferably, as shown in FIG. 3A, the optical axes (211 and 231, respectively) of the first and second birefringent films are parallel and the polarizing axes (221 and 241, respectively) of the first and second polarizing films are parallel.

Figure 4A:
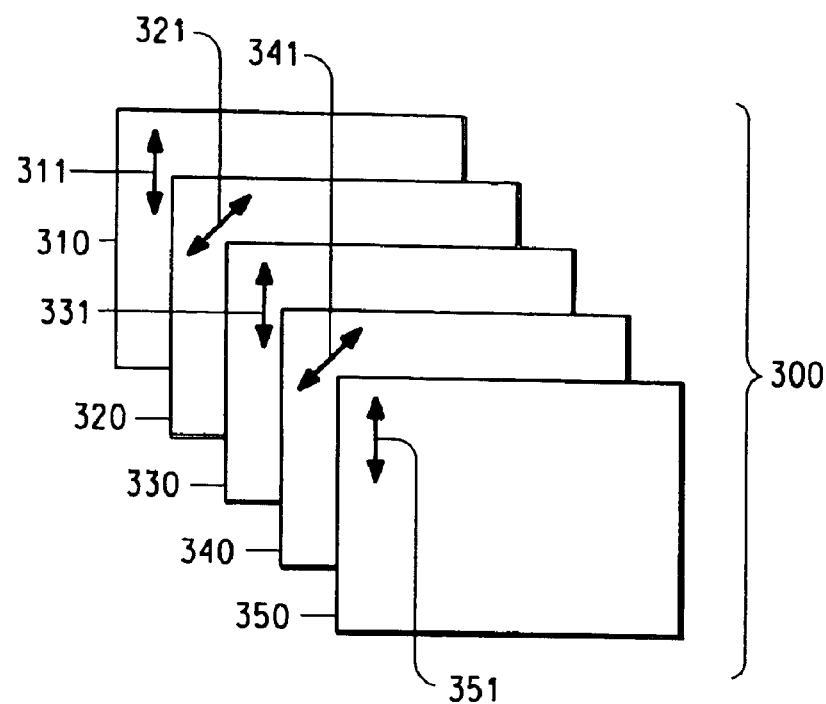
FIG. 4A is a perspective front view of a five-layer privacy screen, which is yet another embodiment of this invention.
Figure 4B:
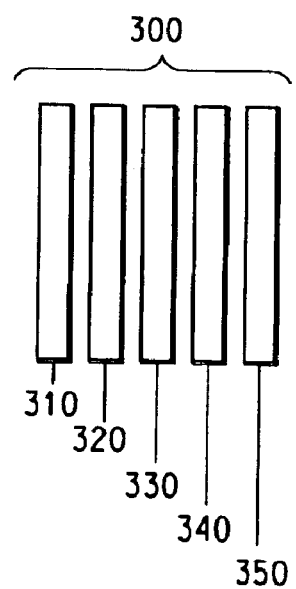
FIG. 4B is a side view of the five-layer privacy screen of FIG. 4A.

In yet another embodiment, the privacy screen 300 of this invention comprises a first birefringent film 310, a first polarizing film 320, a second birefringent film 330, a second polarizing film 340, and a third birefringent film 350 as illustrated in FIGS. 4a and 4b. Both birefringent films can possess properties such that they are uniaxally birefringent or biaxally birefringent (as defined below). Preferably these films are uniaxally birefringent. The first polarizing film is also sometimes called an analyzer. The first, second, and third birefringent films 310, 330, and 350 possesses optical axes and the first and second polarizing films 320 and 340 possesses polarizing axes. The angular relationships between the display polarizing axis, the optical axes of the first, second, and third birefringent films, and the polarizing axes of the first and second polarizing films are not limited apart from there being preferences for these angular relationships. Preferably, in this embodiment, the display polarizing axis is orthogonal (90° angular relationship, crossed configuration) or approximately orthogonal to the polarizing axes of the first and second polarizing films and the optical axes of the first, second, and third birefringent films approximately bisect the angle between the display polarizing axis and the polarizing axes of the first and second polarizing films. This preference corresponds to the relationships of the axes as shown in FIGS. 1 and 4A where the display polarizing axis is 16, the optical axis of the first birefringent film is 311, the polarizing axis of the first polarizing film is 321, the optical axis of the second birefringent film is 331, the polarizing axis of the second polarizing film is 341, and the optical axis of the third birefringent film is 351. Preferably, as shown in FIG. 4A, the optical axes (311, 331, and 351, respectively) of the first, second, and third birefringent films are parallel and that the polarizing axes (321 and 341, respectively) of the first and second polarizing films are parallel.

FIG. 5 illustrates use of an embodiment (100) of this invention as a privacy screen for a typical back-lit LCD arrangement. Light 15 generated by a source 20 behind the LCD screen 10, in combination with electronic activation of the LCD screen pixels, generates an image on the screen. That light permeates through the transparent portions of the screen. This light can radiate orthogonally, as well as at various different angles to the face of the LCD screen. A conventional display output polarizer 30 may optionally be used on the exit side of the LCD display 10 to create the display image and define the display polarizing axis. A LCD display that is a complete unit having polarizers already attached to the cell possesses a display polarizing axis by virtue of the polarizers; adding a display output polarizer 30 in this case is not necessary but is optional and may be advantageous where a display has a polarization angle other than +/−45°. The LCD 10 (if equipped with polarizer(s)) and/or the display output polarizer 30 serve(s) as the input polarizer for the privacy screen and will be referred to as the "input polarizer". If an LCD is not being used as the display (e.g., if a plasma display or cathode ray tube (CRT) is being used) then, in this case, an input polarizer must be added in front of the non-LCD display in order for the display to have a defined optical axis.

A polarizer (polarizing film) transmits only those wavetrain components of light which vibrate parallel to the polarizing direction of the film and absorbs those that vibrate at a right angle to said direction. While some wavetrain components not parallel to the polarizing direction of the polarizing film may be transmitted, the light emerging (passing through) the polarizing film is substantially linearly polarized.

A material is birefringent if it has different refractive indices in different directions. Any material may be fully characterized by 3 principle indices along orthogonal axes. If two of these indices are the same (called "ordinary", $n_o$) and the third is different (called "extraordinary", $n_e$) it is uniaxially birefringent. If $n_e > n_o$ it is positively birefringent. If the refractive index is the same in all three directions the material is referred to as "isotropic".

In a uniaxially birefringent film structure, if the extraordinary index (or c-axis) lies in the plane of the film, it is referred to as an a-plate. This is because it has the same optical symmetry as what crystallographers refer to as an a-cut crystal. Such an a-plate is said to be half-wave if its thickness, $d_1$ and birefringence $n_e - n_o$ are chosen such that:

$$(n_e - n_o)d = \lambda/2$$

where $\lambda$ is the wavelength of incident light. Half-waveplates have the property that when plane polarized light is incident on them such that the polarization vector makes an angle theta (θ) with the extraordinary axis of the film, the plane of polarization is rotated by twice theta as the light passes through.

A biaxially birefringent film is defined to be one in which all three principal indices of refraction have different values, i.e., $n_a \neq n_b \neq n_c$ and $n_a \neq n_c$, where a, b, and c are unit vectors with a and b defining a film plane and c is normal to this film plane. For a biaxially birefringent film of thickness d with light incident normally the retardation is given the equation:

$$R_o = [n_b - n_a]d$$

A biaxial film possesses two optical axes which, in the case $n_a < n_b < n_c$, are in the ac plane with the angle a on either side of c given by the equation:

$$\tan \alpha = n_c/n_a \, ((n_b^2 - n_a^2)/(n_c^2 - n_b^2))^{1/2}$$

For a baxially birefringent film, the retardation value is approximated by the relationship below as shown below if delta n is small (<=~0.01):

$$R_\theta \sim = R_o[1 + \sin^2 \theta / 2 n_i n_{avg}]$$

where $n_{avg}$ is the average index (average of $n_a$, $n_b$, and $n_c$) and $n_i$ is selected from the group consisting of $n_a$, $n_b$, and $n_c$ to correspond to the unit vector (a, b, or c) that describes the vertical direction of the display. As one example, for the specific case of retardation of a biaxial film with θ in the bc plane (horizontal if a is vertical), the retardation value is approximately as shown below:

$$R_\theta \sim = R_o[1 + \sin^2 \theta / 2 n_{avg}]$$

It is important to emphasize that the above approximation is true only if projection of one of the optical axes of the biaxial film onto a film plane of the biaxial film is 90° to a plane of incidence containing θ for light that is incident upon the film. If the ordering of $n_i$ is different than that shown above, then one must appropriately modify the above equations or approximations. In general, retardation values for other cases involving biaxially birefringent films are vastly more complex and can only be described by complex matrix representations.

As explained supra, FIG. 5 illustrates one embodiment of the privacy screen 100 of this invention comprising a first birefringent film 110 and a first polarizing film (analyzer) 120 being used on a display screen 10 that is equipped with an input polarizer 30. Components of light upon exiting the input polarizer 30 and passing through the first birefringent film will have their polarization axis rotated appreciably and to an extent that is proportional to distance that the light traverses in passing through the birefringent film. For orthogonal light, the distance traversed in passing through the birefringent film is minimal and equal to the thickness d of the film. For non-orthogonal (oblique) light, the distance is greater than the thickness d of the film and depends upon the angle measured with respect to normal that the light is incident upon the film. In the present invention, the degree of birefringence (e.g., $n_e - n_o$ for a uniaxial birefringent film) and the thickness d of the birefringent film are chosen appropriately in relation to the optical and polarizing axes of the display and privacy screen such that substantially all orthogonal light is transmitted through the privacy screen, exits film 120 and hence is viewable by an observer while non-orthogonal light in the horizontal direction is substantially blocked by the privacy screen, does not exit film 120, and hence is not viewable by an observer.

In a preferred embodiment of the privacy screen 100 in use on a display screen 10 having a display polarizing axis 16, the polarizing axis of the first polarizing film 120 will be crossed (at 90°) to the display polarizing axis as shown in FIGS. 1 and 2A. The degree of birefringence and thickness of the first birefringent film have been chosen such that an orthogonal light ray will have its polarization vector rotated by approximately 90° upon passing through the birefringent film 110. Thus orthogonal light upon exiting the birefringent film will have its polarization vector parallel or substantially parallel to the polarizing axis of the first polarizing film and will be transmitted such that it is seen by an observer. In contrast, non-orthogonal light rays will have their polarization vectors rotated to angles that are greater than 90° with the amount of rotation being greater for rays that are incident upon the birefringent film at more oblique angles. Consequently, a substantial amount of oblique light rays will not have their polarization vectors parallel to the polarizing axis of the first polarizing film, will not be transmitted through the privacy screen, and hence will not be observable by an observer. In brief for this embodiment, the first birefringent film and the first polarizing film, which comprise the privacy screen, work in combination to prevent light traversing the birefringent film in an oblique horizontal manner and transmitted through the LCD and/or the input polarizer 30 from reaching an observer. In sharp contrast, normally incident light is not blocked by the privacy screen and is viewable to an observer viewing at or near the normal direction.

FIG. 6 illustrates use of another embodiment (200) of this invention as a privacy screen for a typical back-lit LCD arrangement. The function and operation of the back-lit LCD arrangement is the same as described supra. In this embodiment, the privacy screen 200 comprises four layers as described supra together with a hinge to position the first birefringent layer 210 either directly adjacent the first polarizing film 220 (as shown in FIG. 6) or directly adjacent the second polarizing film 240. The choice of which of these two positions is the correct position for the birefringent layer 210 depends upon whether the display polarization is +45° or −45° and can be determined by trial and error. (Almost all displays have one of these polarizations.) If the correct choice is made, the privacy screen will afford the privacy effect—i.e. substantially blocking of non-orthogonal horizontal light rays from passing through the screen. If the incorrect choice is made, the privacy screen will not afford the privacy effect and also will produce color distortions; in this case, one simply then selects the other choice to give the privacy effect. The purposes and functions of the first birefringent film and first polarizing film in this embodiment are the same as described supra for the previously described embodiment. The purpose of the second birefringent film and second polarizing film in this embodiment are to act in combination to remove additional amounts of non-orthogonal light and hence enhance the extent of the privacy effect. This enhancement is seen by comparing the results of Example 3 versus those for Examples 1 or 2.

More specifically, the enhancement described above is needed because retardation at a normal incident view zone for the first embodiment is λ/2 which passes through the first polarizing film. The retardation changes to λ at more oblique angles, e.g. perhaps 30° where the privacy effect is still present. Since this retardation behaves as a function of cosine of θ, as θ changes through this plane, at some angle the retardation will shift towards 3λ/2 and, thus, also pass through the first polarizing film. This embodiment has a second birefringent film whose retardation characteristics are a zero or λ (the same thing) at the normal zone such that normal or near normal light can pass through the second polarizing film. Furthermore, the second birefringent film has a retardation of λ/2 at the angle which coincides with the 3λ/2 of the first birefringent film such that non-normal light will now be blocked by the second polarizing film when it is parallel to the first polarizing film.

Figure 7:
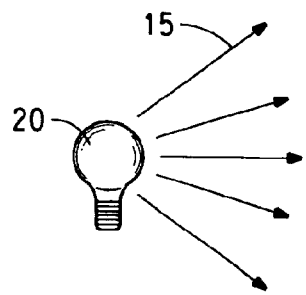
FIG. 7 is a side view of yet another embodiment (300) of the privacy screen of this invention in use on a typical back-lit display.
Figure 7:
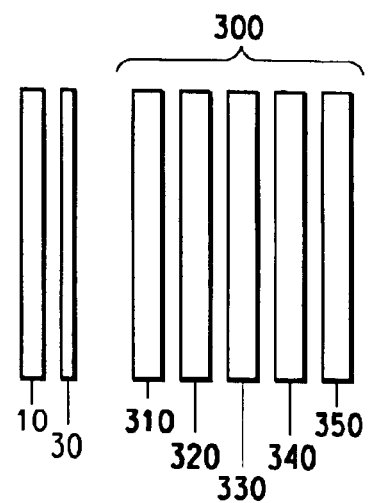

FIG. 7 illustrates use of another embodiment (300) of this invention as a privacy screen for a typical back-it LCD arrangement. The function and operation of the back-lit LCD arrangement is the same as described above. In this embodiment, the privacy screen 300 comprises five layers as described above and in which the third birefringent film is equivalent to the first birefringent film. The purposes and functions of the first and second birefringent films and first and second polarizing films are the same as described above for privacy screen 200. The purpose and function of the third birefringent film is to provide an equivalent film to the first birefringent film in a five-layer film structure such that both the first and second polarizing films will have an equivalent birefringent layer adjacent to it. Depending upon the polarization of a given display (+45° or −45°) being equipped with a privacy screen 300, either the first birefringent film or the third birefringent film will need to be adjacent to the display screen in order for the privacy effect to result. This 5-layer structure eliminates the need for a hinge as is present in the previously described embodiment.

Some additional specifications for the birefringent films and polarizing films in this invention are presented next.

The first, second, and third birefringent films can be either uniaxially birefringent or biaxially birefringent, with the former being preferred. The first and third birefringent films have a thickness $d_1$, wherein $d_1$ is greater than 25 micrometers so that R (retardation value) is responsive to changes in θ (as was discussed above). Preferably, the first and third birefringent films have a thickness $d_1$ is greater than 100 micrometers. The second birefringent film has a thickness $d_2$ of greater than or equal to 25 micrometers. Preferably, the first, second, and third birefringent films have thicknesses ranging from about 25 microns to about 1000 microns. If the film thickness is appreciably below about 25 microns, the retardation value is too low for birefringent films having suitable differences in refractive indices. If the film thickness is appreciably above about 1000 microns, overall thickness of the privacy screen may be too thick and cumbersome in many applications. Furthermore, the first, second, and third birefringent films have differences in refractive indices between two of the film axes that range from about 0.00002 to about 0.001. If the difference in refractive indices is less than about 0.00002, the retardation value will be too low and the extent of the privacy effect will be too small or negligible. If the differences in refractive indices are greater than about 0.001, the birefringent films will impart undesirable chromatic effects to the light passing through them. For the specific case of uniaxially birefringent films, $\Delta n = n_e - n_o$ ranges from about 0.00002 to about 0.001. The first, second, and third birefringent films are chosen in this invention such that they exhibit birefringence in the visible and infrared regions of the electromagnetic spectrum. Preferably the birefringent films are polymeric and include, but are not limited to, films of cellulose acetate (e.g., cellulose diacetate (CDA)), polyvinyl alcohol, polycarbonate, and mixtures thereof.

The invention described herein does not require any particular method for obtaining a birefringent film, there being several techniques for producing them as shown in the published literature. One technique that is commonly employed is to uniaxially stretch certain plastic films, such as polycarbonate, polyvinyl alcohol, and cellulose acetate polymeric films. An alternative is to solvent cast a solution of a polymerizable liquid crystal monomer onto a rubbed polyimide film. The c-axis of the liquid crystal film which is formed will align with the rub direction of the polyimide film. The film is dried and polymerized leaving a birefringent polymer coating on the polyimide film. Other methods of forming such birefringent films are known to those skilled in the art.

The first and second polarizing films in this invention are not limited except for the requirement that they act to alter and analyze the state of polarization of light. Specifically, the polarizing films act to analyze the state of polarization either to block or to pass depending on the state which was altered by the birefringent film. Of course passing can imply altering since, if the state is elliptical polarization, the polarizer will allow only some of the elliptically polarized light to pass as linear, that which is aligned or parallel on the axis upon passage of the light through one of these films. When polarized light from a display interacts with the first or second birefringent film in this invention, its state of polarization is altered and, most importantly, its state is altered differently as to angle of the light incident upon it with respect to normal. The polarizers act to either pass or block light rays having these states of polarization according to their angles with respect to normal. Specifically, in this invention, the first and second polarizers in combination with the birefringent films act to pass light within the view zone through the polarizers while blocking light within the privacy zone. Any of many different commercially available polarizers can be employed in this invention as the polarizing films. Both the first and second polarizing films possess polarizing axes, such that upon passage of light through these films, the state of polarization of the light is analyzed as described supra. Again it is the birefringent film that does the altering and the polarizers analyze the state by either passing or blocking said state.

There are preferences in this invention with regard to orientation of the polarizing axes of the polarizing films as well as the optical axes of the birefringent films with respect to the display polarizing axis for a display bearing a privacy screen according to the invention. In one preferred embodiment, the polarizing axis of the first polarizing film is oriented at a first angle of 90° plus or minus 60° to the display polarizing axis and the polarizing axis of the second polarizing film is oriented at a second angle of 90° plus or minus 60° to the display polarizing axis. In a more preferred embodiment, the polarizing axis of the first polarizing film is oriented at a first angle of 90° plus or minus 15° to the display polarizing axis, the polarizing axis of the second polarizing film is oriented at a second angle of 90° plus or minus 15° to the display polarizing axis, the optical axis of the first uniaxially birefringent film approximately bisects the first angle, and the optical axis of the second birefringent film approximately bisects the second angle. In a still more preferred embodiment, the polarizing axis of the first polarizing film is orthogonal to the display polarizing axis, and, in addition in a most preferred embodiment, the polarizing axis of the second polarizing film is orthogonal to the display polarizing axis.

Figure 8:
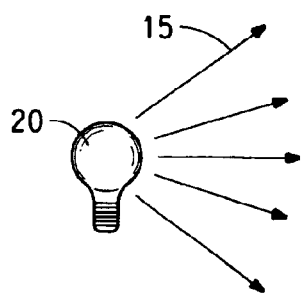
FIG. 8 is a side view of one embodiment (100) of the privacy screen of this invention together with use of a brightness enhancing film.
Figure 8:
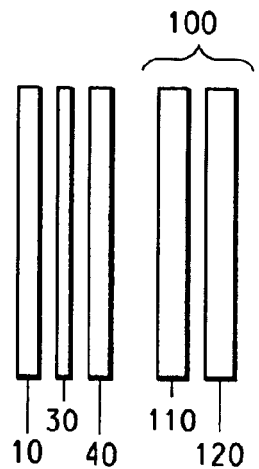
Figure 9:
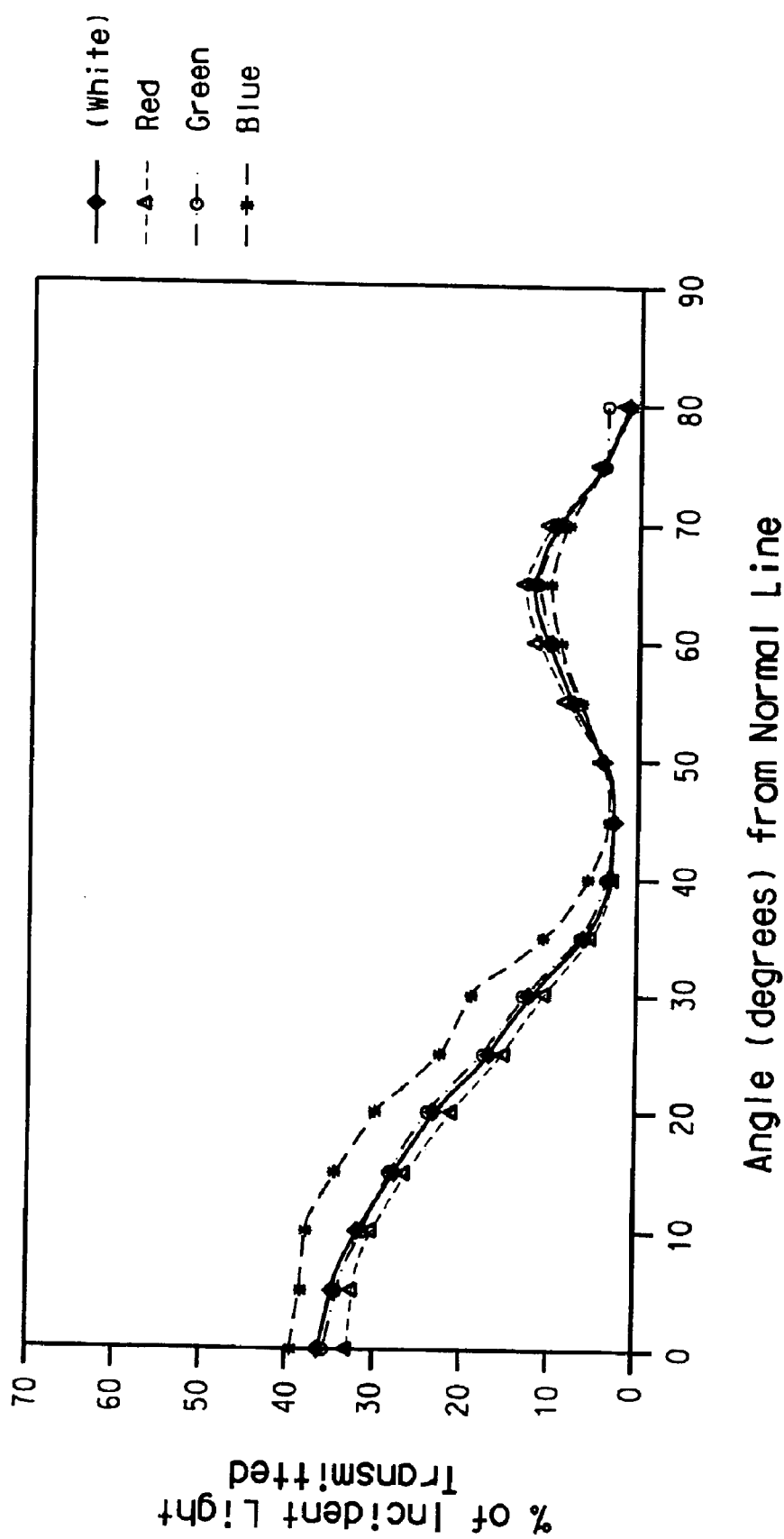
FIG. 9 is a graph of the percent of incident light transmitted versus angle with respect to normal for the privacy screen of Example 1.
Figure 10:
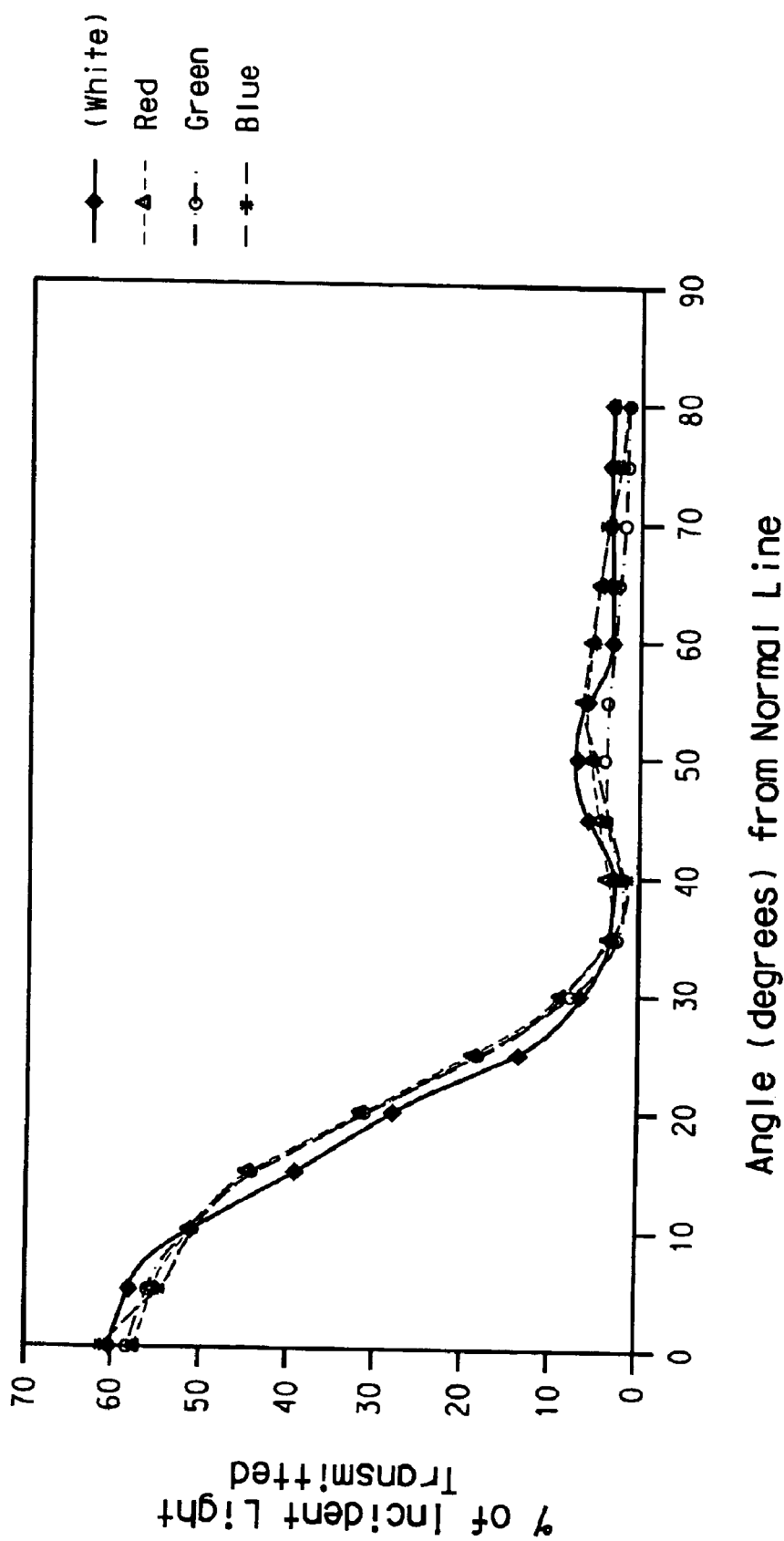
FIG. 10 is a graph of the percent of incident light transmitted versus angle with respect to normal for the privacy screen of Example 2.
Figure 11:
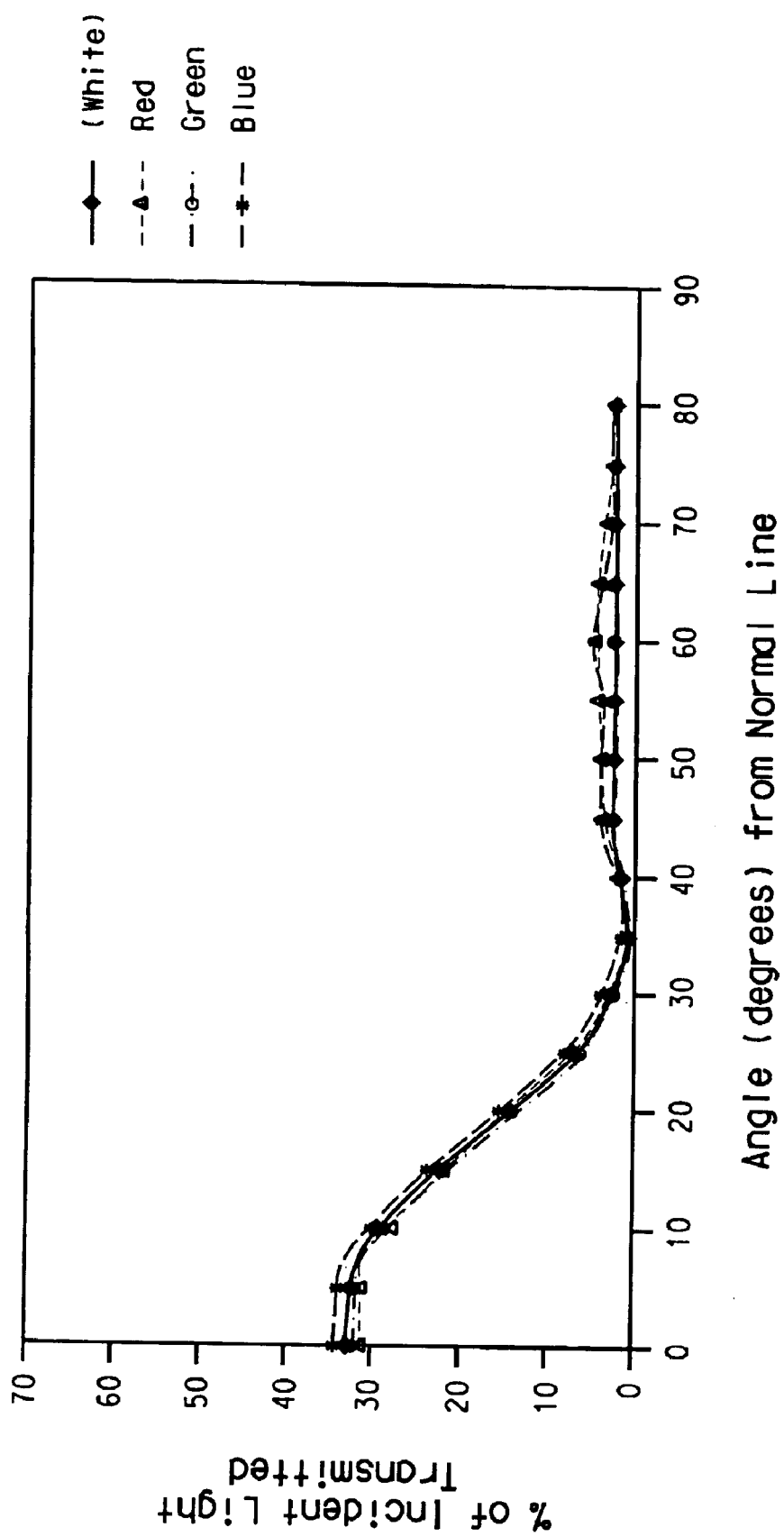
FIG. 11 is a graph of the percent of incident light transmitted versus angle with respect to normal for the privacy screen of Example 3.
Figure 12:
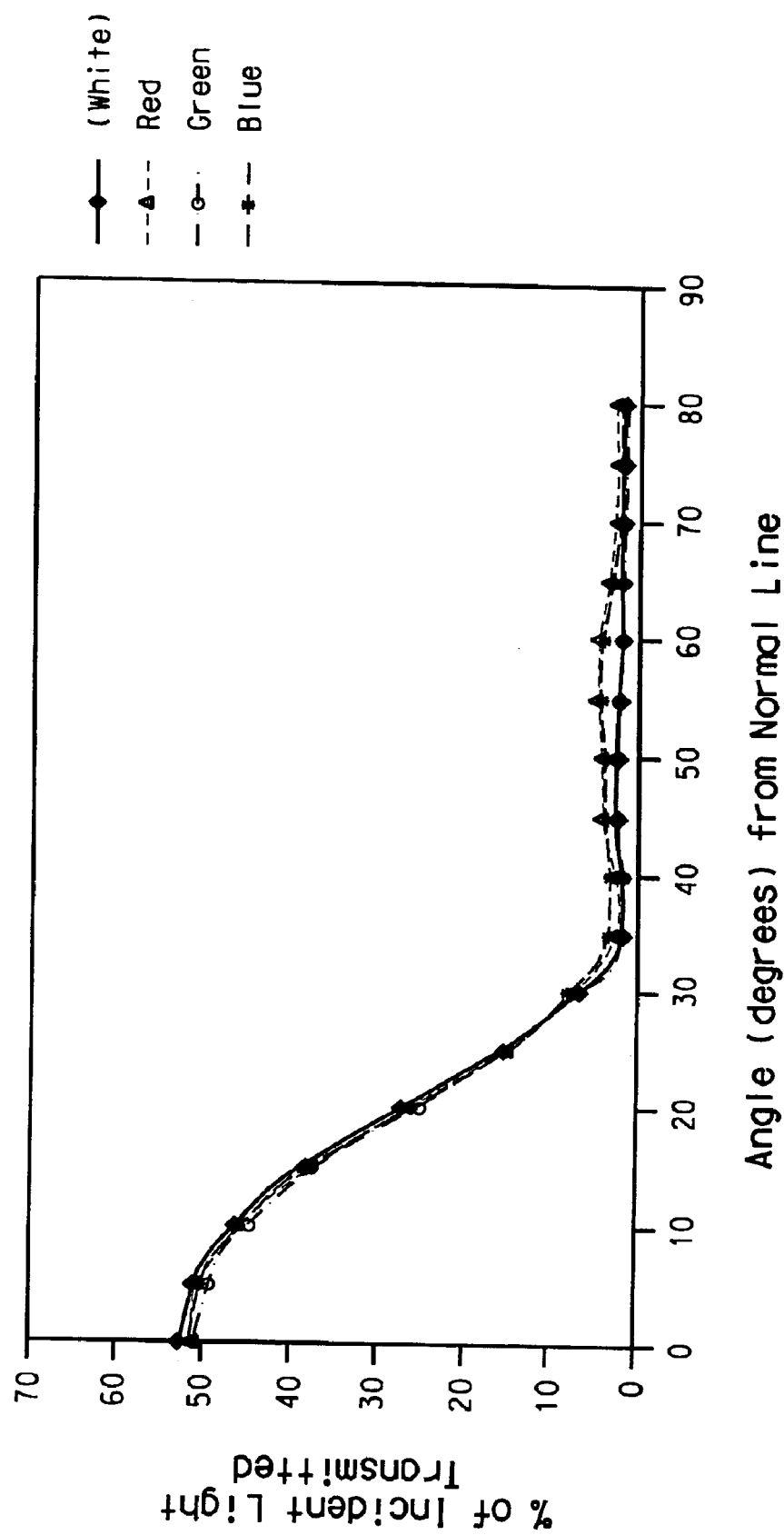
FIG. 12 is a graph of the percent of incident light transmitted versus angle with respect to normal for the privacy screen of Example 4.

As a further improvement of the above-described device, a brightness enhancing film 40 can be added at various locations, such as shown in FIG. 8, beyond the LCD screen 10 and input polarizer 30. (It can also be added in other locations, such as between the LCD screen 10 and the input polarizer 30.) A brightness enhancing film utilizes refractive optics to concentrate light in a more forward direction so that less light is transmitted in the oblique direction. These films are commercially available. The brightness enhancing film 40 focuses the light emanating from the LCD screen 10/input polarizer 30 so that more of the light reaches the back surface of the privacy screen 100 making the viewed image brighter through its normal view zone and, as a result, the light reaching the observer is more intense. When a brightness enhancing film is used less light is available at angles further from orthogonal. The use of privacy screen 100 together with a brightness enhancing film 40 that are mounted to a display screen 10/input polarizer 30 is illustrated in FIG. 8.

While the invention has been shown and described with reference to different embodiments thereof, it will be appreciated by those having skill in the art that variations in form, detail, compositions, and operating conditions may be made without departing from the spirit and scope of the invention as defined by the accompanying claims.

Glossary

CDA Cellulose Diacetate film; film thicknesses that were used in the examples were in the range 7–28 mils; Clarifoil, an ACORDIS group member, (Spondon, Derby, United Kingdom)

C.I.E. Commission Internationale de l'Eclairage or International Commission on Illumination LCD Liquid Crystal Display; the LCDs used in the examples were from Envision Peripherals, Incorporated, (Fremont, Calif.), LP Linear Polarizer; the LPs used in the examples were Tech Spec Linear Polarizing Laminated Film, obtained from Edmund Scientific, (Barrington, N.J.).

PSA Pressure Sensitive Adhesive; the PSA materials used in the examples were a product designated AD-20 from Polatechno Company Limited, (Hong Kong, China).

RGB This term designates, respectively, the colors Red/Green/Blue at the nominal wavelengths of 632 nm for red, 550 nm for blue, and 470 nm for blue.

$T_{miss}$ Transmission, which is the amount ($I_{transmitted}$) of radiation (without regard to wavelength) that passes through a material relative to the amount ($I_{incident}$) that is incident as a percent; $T_{mis}=I_{transmitted}/I_{incident} \times 100$ $T_{mitt}$ Transmittance, which is the ratio of the amount $(I(\lambda)_{transmitted})$ of radiation of a particular wavelength $\lambda$ that passes through a material to the amount $(I(\lambda)_{incident})$ incident at that wavelength as a percent: $T_{mitt}=I(\lambda)_{transmitted}/I(\lambda)_{incident} \times 100$ VLT Visible Light Transmission; Transmission using a white light source described as a C.I.E. equal energy source $\lambda$ Wavelength of electromagnetic radiation (light) in nanometers ($10^{-9}$ meters)

EXAMPLES

Example 1

In this example, a privacy screen having a two-layer structure plus a spacer was prepared and tested to demonstrate the privacy effect. More specifically, the two-layer structure consisted of a single birefringent material, which was 20 mil CDA, and a LP, which was Tech Spec Linear Polarizing Laminated Film. The CDA and LP were separated by a 1/16" spacer with an open window aperture of 4.5"×3". The optical axis of the CDA, which coincided with the machine direction of the cast CDA web, was orientated vertically (along the y axis with z being orthogonal to the xy plane of the display and x being the horizontal direction) with respect to the display axis and the LP was aligned with the polarizing axis oriented 45° to the optical axis of the CDA as well as orthogonal (crossed) with respect to the polarization axis of the display output, assuming the polarization axis of the display is at −45°. The edges of the sample were then taped for personnel safety reasons.

The sample (privacy screen) was attached by clamping to the front of a full color LCD mounted on a Newport rotation stage. A Photo Research Spectroscan 650 scanning spectroradiometer (Photo Research Inc., Chatworth, Calif.) was mounted 24" from the normal face of the LCD. The LCD output was switchable between C.I.E. white equal energy point and saturated red, green, and blue (RGB) screens. Transmission and transmittance measurements were then taken through rotations of 80" by 5° increments in the horizontal plane on either side of normal to the display. The results were observed to be symmetrical on either side of normal. The average results (on either side of normal in the horizontal plane) that were obtained are displayed in Table I as percent of incident light transmitted through the privacy screen.

TABLE 1

| Angle (°) | $T_{miss}$ White | Red | $T_{miTT}$ Green | Blue |
|---|---|---|---|---|
| 0 | 36 | 33 | 36 | 39 |
| 5 | 35 | 32 | 34 | 38 |
| 10 | 32 | 29 | 31 | 37 |
| 15 | 28 | 26 | 29 | 34 |
| 20 | 24 | 22 | 25 | 30 |
| 25 | 17 | 15 | 18 | 23 |
| 30 | 13 | 11 | 13 | 19 |
| 35 | 7 | 5 | 7 | 10 |
| 40 | 3 | 3 | 4 | 6 |
| 45 | 3 | 3 | 3 | 3 |
| 50 | 5 | 5 | 4 | 4 |
| 55 | 7 | 8 | 7 | 6 |
| 60 | 11 | 12 | 10 | 9 |
| 65 | 12 | 13 | 11 | 10 |
| 70 | 9 | 10 | 9 | 7 |
| 75 | 3 | 4 | 4 | 4 |
| 80 | 2 | 2 | 3 | 1 |

Example 2

In this example, a privacy screen having a two-layer structure (not including a thin PSA adhesive layer) having a thicker birefringent material layer of CDA than in Example 1 was prepared and tested to further demonstrate the privacy effect. More specifically, the two-layer structure in order consisted of a single birefringent material, which was CDA of thickness equal to 27 mils, and a LP, which was Tech Spec Linear Polarizing Laminated Film. These two layers were adhered together using PSA as a thin adhesive layer of undetermined thickness; the PSA in this example replaced the spacer of Example 1. Use of PSA resulted in the entire structure being laminated into a single inseparable film stack. In this example, the CDA layer thickness was increased to 27 mils (from the 20 mils in Example 1) in order to demonstrate an increased VLT through the desired view zone while maintaining the privacy concept through the desired angels. The optical axis of the CDA was again orientated vertically with respect to the display axis and the LP was aligned with the polarizing axis oriented 45° with respect to the optical axis of the CDA as well as orthogonal (crossed) with respect to the polarization axis of the display output, again assuming the polarization axis of the display was −45°.

The PSA-laminated two-layer privacy screen was attached to the front of the full color LCD mounted on a Newport rotation stage. Transmission and transmittance measurements were then made in the same manner as described in Example 1. The results that were obtained are give in Table 2.

TABLE 2

| Angle (°) | $T_{miss}$ (White) | Red | $T_{mitt}$ Green | Blue |
|---|---|---|---|---|
| 0 | 61 | 58 | 59 | 62 |
| 5 | 58 | 56 | 56 | 56 |
| 10 | 51 | 52 | 52 | 51 |
| 15 | 39 | 45 | 44 | 43 |
| 20 | 28 | 33 | 31 | 32 |
| 25 | 13 | 20 | 18 | 19 |
| 30 | 5 | 8 | 7 | 8 |
| 35 | 3 | 3 | 2 | 2 |
| 40 | 2 | 3 | 1 | 1 |
| 45 | 5 | 4 | 3 | 3 |
| 50 | 7 | 5 | 3 | 4 |
| 55 | 5 | 6 | 3 | 6 |
| 60 | 3 | 5 | 2 | 5 |
| 65 | 3 | 4 | 2 | 3 |
| 70 | 3 | 3 | 2 | 3 |
| 75 | 3 | 3 | 1 | 2 |
| 80 | 3 | 3 | 1 | 1 |

Example 3

In this example, a privacy screen having a four-layer structure was prepared and tested to demonstrate a higher level of the privacy effect resulting from use of this structure which contains two CDA layers. More specifically, in this example, the four-layer hinged structure consisted of a 20 mil CDA film, which was hinged with a strip of masking tape along the top together with a film stack consisting of a LP, a 10 mil CDA film, and a second LP. The 10 mil CDA was placed vertically between two parallel LP's whose axes were orientated 45° with respect to the optical axis of the CDA. This stack of three layers (not including the 20 mil CDA) was laminated together with PSA.

The hinge allowed the 20 mil CDA film to be flipped and rotated so that it could have been used on LCD's whose output polarization was either +45° or −45° (unique to the display manufacturer). To be utilized as a privacy screen, the 20 mil CDA must be the first material (rear film) incident to the display output. Likewise, the axis of the LP must be crossed (orthogonal) to that of the display output polarization. To properly align the device on the LCD, the hinge was opened so that the 20 mil CDA was vertically above but not in front of the display. Then, by looking through the LP stack against the display, the proper orientation was determined by observing from which side the display appeared black. Once the proper orientation was determined, the 20 mil CDA was folded back behind the LP stack.

This example was qualitatively viewed on a number of displays as proof of concept that this privacy screen concept would work on many laptop computers currently on the market as well as desktop LCD's.

The four-layer privacy screen of this example was then mounted to the measuring LCD and measured as previously described and afforded results that are shown in Table 3.

TABLE 3

| Angle (°) | $T_{miss}$ (White) | Red | $T_{mitt}$ Green | Blue |
|---|---|---|---|---|
| 0 | 33 | 32 | 33 | 34 |
| 5 | 32 | 31 | 32 | 34 |
| 10 | 28 | 27 | 29 | 30 |
| 15 | 22 | 22 | 22 | 24 |
| 20 | 14 | 15 | 14 | 16 |
| 25 | 8 | 8 | 8 | 9 |
| 30 | 3 | 4 | 3 | 4 |
| 35 | 1 | 2 | 1 | 1 |
| 40 | 1 | 2 | 1 | 1 |
| 45 | 2 | 3 | 2 | 3 |
| 50 | 2 | 3 | 2 | 3 |
| 55 | 1 | 4 | 2 | 3 |
| 60 | 1 | 4 | 2 | 4 |
| 65 | 1 | 3 | 2 | 3 |
| 70 | 1 | 3 | 1 | 2 |
| 75 | 1 | 2 | 1 | 2 |
| 80 | 1 | 2 | 1 | 1 |

Example 4

In this example, a privacy screen having a five-layer structure was prepared and tested to demonstrate that use of this structure as a privacy screen can be made to afford the privacy effect in a display regardless of the display's output polarization. More specifically, in this example, the five-layer structure was such that the first and fifth layers were identical so that it could be reversed for use on LCD's whose output polarization was either +45° or −45°, thereby eliminating the need for the hinge described in Example 3. The entire example was laminated together into a single stack using PSA between each of the 5 layers.

The stack was constructed with a 27 mil CDA first layer with its optical axis vertical, followed by a LP with its axis 45° from vertical, followed by a 10 mil CDA with optical axis vertical, followed by a second LP whose axis was parallel to the first LP, and finally followed by a 27 mil CDA whose axis was parallel to each of the other CDA layers. In general, all CDA layer were parallel and had optical axes in the vertical. The two LP layers were parallel with axes tilted 45° with respect to the axes of the CDA. (Note: vertical alignment of the CDA optical axes provides an axis of symmetry for privacy performance in the horizontal plane).

Proper orientation of the 5-layer privacy screen of this example on various LCD's whose polarization output was at either +45° or −45° was achieved by observation of both the existence of the privacy effect and abnormal color variation. When the 5-layer structure of this example was placed on the display incorrectly, the colors of the display output appeared brown and no privacy effect was observed. When placed correctly on the display, color fidelity was maintained albeit somewhat darkened with the privacy effect fully apparent.

In a similar manner done as was done in the preceding examples, the five-layer privacy screen was then mounted to a measuring LCD and measured as previously described with results displayed in Table 4.

TABLE 4

| Angle (°) | $T_{miss}$ (White) | Red | $T_{mitt}$ Green | Blue |
|---|---|---|---|---|
| 0 | 52 | 51 | 50 | 50 |
| 5 | 51 | 50 | 49 | 50 |
| 10 | 46 | 46 | 44 | 46 |
| 15 | 38 | 38 | 37 | 37 |
| 20 | 27 | 27 | 25 | 27 |
| 25 | 15 | 16 | 15 | 16 |
| 30 | 6 | 7 | 6 | 7 |
| 35 | 2 | 2 | 2 | 3 |

TABLE 4-continued

| Angle (°) | $T_{miss}$ (White) | Red | $T_{mitt}$ Green | Blue |
|---|---|---|---|---|
| 40 | 1 | 2 | 1 | 2 |
| 45 | 2 | 4 | 2 | 3 |
| 50 | 2 | 4 | 2 | 3 |
| 55 | 2 | 5 | 2 | 4 |
| 60 | 1 | 4 | 2 | 3 |
| 65 | 1 | 4 | 2 | 3 |
| 70 | 1 | 3 | 1 | 2 |
| 75 | 1 | 3 | 1 | 1 |
| 80 | 1 | 3 | 1 | 1 |

What is claimed is:

1. A privacy screen for a display having a polarizing axis comprising:
   a) a first uniaxially birefringent film for transmitting light received from the display that wherein the light is linearly polarized along the display polarizing axis, the first birefringent film having a thickness $d_1$ and a retardation value R:

$$R=(n_e-n_o)\,d_1/\cos\theta$$

$\theta$ being the angle of light incident upon the screen from the display, and $n_o$ and $n_e$ being the refractive indices, respectively, along the ordinary and extraordinary axes of the first birefringent film,
   wherein $d_1$ is greater than 25 micrometers so that R is responsive to changes in $\theta$; and
   b) a first polarizing film having a polarizing axis positioned to receive the linear polarized light transmitted from the first birefringent film.

2. The privacy screen of claim 1 further comprising:
   c) a second birefringent film for transmitting light received from the first polarizing film that is linearly polarized to the polarizing axis of the first polarizing film, the second birefringent film having a thickness $d_2$ of greater than or equal to 25 micrometers; and
   d) a second polarizing film positioned to receive the substantially linear polarized light transmitted from the second birefringent film, the second polarizing film having a polarizing axis.

3. The privacy screen of claim 2 further comprising:
   e) a third uniaxially birefringent film for transmitting light received from the second polarizing film that is linearly polarized to the polarizing axis of the second polarizing film, the third birefringent film being equivalent to the first birefringent film and having a polarizing axis.

4. The privacy screen of claim 2 further comprising a hinge in order that the first birefringent film can be rotated and positioned to be adjacent to either the first polarizing film or the second polarizing film, depending upon which position is required to achieve the privacy effect for the display.

5. The privacy screen of claim 1 or 2 wherein the first and second birefringent films exhibit birefringence in the visible and infrared regions of the electromagnetic spectrum.

6. The privacy screen of claim 1 or 2 wherein the first and second birefringent films have $n_e$-$n_o$ values ranging from about 0.00002 to about 0.001.

7. The privacy screen of claim 1 or 2 wherein the first and second birefringent films have thicknesses ranging from about 25 microns to about 1000 microns.

8. The privacy screen of claim 2 wherein the polarizing axis of the first polarizing film is oriented at a first angle of 90° plus or minus 60° to the display polarizing axis and the polarizing axis of the second polarizing film is oriented at a second angle of 90° plus or minus 60° to the display polarizing axis.

9. The privacy screen of claim 8 wherein the polarizing axis of the first polarizing film is oriented at a first angle of 90° plus or minus 15° to the display polarizing axis, the polarizing axis of the second polarizing film is oriented at a second angle of 90° plus or minus 15° to the display polarizing axis, the optical axis of the first uniaxially birefringent film approximately bisects the first angle, and the optical axis of the second birefringent film approximately bisects the second angle.

10. The privacy screen of claim 8 wherein the polarizing axis of the first polarizing film is orthogonal to the display polarizing axis.

11. The privacy screen of claim 10 wherein the polarizing axis of the second polarizing film is orthogonal to the display polarizing axis.

12. A privacy screen for a display having a polarizing axis comprising:
   a) a first biaxially birefringent film for transmitting light received from the display wherein the light is substantially linearly polarized along a the display polarizing axis, the first birefringent film having a thickness $d_1$ and a retardation value $R_\theta$ for light incident on the film at an angle $\theta$ measured with respect to normal that is approximated by the relationship below:

$$R_\theta \approx R_o[1+\sin^2\theta/2n_in_{avg}];$$

wherein the first biaxially birefringent film is characterized as having unit vectors a and b that define its film plane and a unit vector c that defines its normal;
   $R_o=[n_b-n_a]d_1$ and is retardation of normal incident light;
   $n_{avg}=(n_o+n_b+n_c)/3$=average index for the biaxially birefringent film;
   $n_i$ is selected from the group consisting of $n_a$, $n_b$, and $n_c$ to correspond to the unit vector (a, b, or c) that describes the vertical direction of the display; and
   $d_1$ is greater than 25 micrometers so that R is responsive to changes in $\theta$; and
   b) a first polarizing film having a polarizing axis positioned to receive the linear polarized light transmitted from the first birefringent film.

13. The privacy screen of claim 12 further comprising:
   c) a second birefringent film for transmitting light received from the first polarizing film that is linearly polarized to the polarizing axis of the first polarizing film, the second birefringent film having a thickness $d_2$ of greater than or equal to 25 micrometers; and
   d) a second polarizing film positioned to receive the linear polarized light transmitted from the second birefringent film, the second polarizing film having a polarizing axis.

14. The privacy screen of claim 13 further comprising:
   e) a third uniaxially birefringent film for transmitting light received from the second polarizing film that is linearly polarized to the polarizing axis of the second polarizing film, the third birefringent film being equivalent to the first birefringent film and having a polarizing axis.

15. The privacy screen of claim 13 further comprising a hinge in order that the first birefringent film can be rotated and positioned to be adjacent to either the first polarizing film or the second polarizing film, depending upon which position is required to achieve the privacy effect for the display.

16. The privacy screen of claim 13 wherein the polarizing axis of the first polarizing film is oriented at a first angle of 90° plus or minus 60° to the display polarizing axis and the polarizing axis of the second polarizing film is oriented at a second angle of 90° plus or minus 60° to the display polarizing axis.

17. The privacy screen of claim 16 wherein the polarizing axis of the first polarizing film is oriented at a first angle of 90° plus or minus 15° to the display polarizing axis, the polarizing axis of the second polarizing film is oriented at a second angle of 90° plus or minus 15° to the display polarizing axis, the optical axis of the first uniaxially birefringent film approximately bisects the first angle, and the optical axis of the second birefringent film approximately bisects the second angle.

18. The privacy screen of claim 16 wherein the polarizing axis of the first polarizing film is orthogonal to the display polarizing axis.

19. The privacy screen of claim 18 wherein the polarizing axis of the second polarizing film is orthogonal to the display polarizing axis.

* * * * *

UNITED STATES PATENT AND TRADEMARK OFFICE
CERTIFICATE OF CORRECTION

PATENT NO. : 7,052,746 B2  Page 1 of 1
APPLICATION NO. : 10/722719
DATED : May 30, 2006
INVENTOR(S) : Macmaster, Steven William It is certified that error appears in the above-identified patent and that said Letters Patent is hereby corrected as shown below:

Column 15, line 19: after "display" delete "that"
Column 15, line 43: delete "substantially"
Column 16, line 23-24: after "is" delete "substantially"
Column 16, line 24: after "along" delete "a"

Signed and Sealed this

Fifth Day of September, 2006

JON W. DUDAS
*Director of the United States Patent and Trademark Office*